(12) United States Patent
Suzuki et al.

(10) Patent No.: US 11,973,417 B2
(45) Date of Patent: Apr. 30, 2024

(54) SYSTEM INTERCONNECTION POWER CONVERSION DEVICE

(71) Applicants: TOKYO ELECTRIC POWER COMPANY HOLDINGS, INCORPORATED, Tokyo (JP); MEIDENSHA CORPORATION, Tokyo (JP)

(72) Inventors: Kenichi Suzuki, Tokyo (JP); Jun Takami, Tokyo (JP); Ryota Samejima, Tokyo (JP); Hideki Noda, Tokyo (JP); Naoto Maeda, Tokyo (JP); Toshiya Inoue, Numadu (JP); Kazu Shoji, Numadu (JP)

(73) Assignees: TOKYO ELECTRIC POWER COMPANY HOLDINGS, INCORPORATED, Tokyo (JP); MEIDENSHA CORPORATION, Tokyo (JP)

(*) Notice: Subject to any disclaimer, the term of this patent is extended or adjusted under 35 U.S.C. 154(b) by 276 days.

(21) Appl. No.: 17/633,794

(22) PCT Filed: Aug. 6, 2020

(86) PCT No.: PCT/JP2020/030141
§ 371 (c)(1),
(2) Date: Feb. 8, 2022

(87) PCT Pub. No.: WO2021/029313
PCT Pub. Date: Feb. 18, 2021

(65) Prior Publication Data
US 2022/0399801 A1    Dec. 15, 2022

(30) Foreign Application Priority Data

Aug. 9, 2019  (JP) ................................ 2019-147562
Aug. 9, 2019  (JP) ................................ 2019-147563
Aug. 9, 2019  (JP) ................................ 2019-147564

(51) Int. Cl.
*H02M 1/32*        (2007.01)
*H02J 3/24*         (2006.01)
(Continued)

(52) U.S. Cl.
CPC ............... *H02M 1/325* (2021.05); *H02J 3/24* (2013.01); *H02J 3/38* (2013.01); *H02M 1/0009* (2021.05);
(Continued)

(58) Field of Classification Search
CPC ............. H02M 1/0003; H02M 1/0009; H02M 1/0012; H02M 1/0025; H02M 1/0032;
(Continued)

(56) References Cited

U.S. PATENT DOCUMENTS

2006/0132074 A1* 6/2006 Yang .................... H02P 25/024
                                                          318/437
2014/0152110 A1   6/2014 Sugimoto et al.
(Continued)

FOREIGN PATENT DOCUMENTS

JP   2007-244068 A   9/2007
JP   2014-168351 A   9/2014
(Continued)

OTHER PUBLICATIONS

Toshiaki Kikuma, "Overcurrent Control Scheme for Virtual Synchronous Generator", The Institute of Electrical Engineers of Japan, IEEJ, 2018, 2 pages.
(Continued)

*Primary Examiner* — Thienvu V Tran
*Assistant Examiner* — Shahzeb K Ahmad
(74) *Attorney, Agent, or Firm* — Foley & Lardner LLP

(57) ABSTRACT

A voltage drop $Vz_s$ is calculated based on an output current detection value Iac and a virtual synchronous impedance Zs
(Continued)

or a corrected virtual synchronous impedance Zs', and a value obtained by subtracting the voltage drop $Vz_s$ from an internal induced voltage Ef is output as a grid voltage command value Vac*. Zs calculation unit 7 limits an output current phase θ so that the output current phase θ is within an effective range by a phase limiter 12a, and calculates the corrected virtual synchronous impedance Zs' based on a limited output current phase θ, the internal induced voltage Ef, a grid voltage detection value Vac and a current limit value Ilim. Accordingly, in grid interconnection power conversion device that controls a virtual synchronous generator, it is possible to continue operation while suppressing an overcurrent and possess a synchronizing power generated by action or working of a virtual synchronous impedance.

11 Claims, 12 Drawing Sheets

(51) Int. Cl.
*H02J 3/38* (2006.01)
*H02M 1/00* (2006.01)
*H02M 7/5387* (2007.01)

(52) U.S. Cl.
CPC ....... *H02M 1/0012* (2021.05); *H02M 1/0025* (2021.05); *H02M 1/0093* (2021.05); *H02M 7/53871* (2013.01)

(58) Field of Classification Search
CPC .... H02M 1/0083; H02M 1/0093; H02M 1/32; H02M 1/325; H02M 7/42; H02M 7/4803; H02M 7/483; H02M 7/487; H02M 7/523; H02M 7/537; H02M 7/538; H02M 7/5387; H02M 7/53871; H02M 7/53873; H02M 7/53876; H02J 3/24; H02J 3/38
See application file for complete search history.

(56) References Cited

U.S. PATENT DOCUMENTS

| | | |
|---|---|---|
| 2016/0006338 A1 | 1/2016 | Sakimoto et al. |
| 2017/0047861 A1* | 2/2017 | Sakimoto ............ H02M 7/5395 |
| 2018/0145582 A1* | 5/2018 | Shuai ...................... H02M 1/32 |
| 2020/0099315 A1* | 3/2020 | Lee ................... H02M 7/53871 |
| 2021/0194383 A1* | 6/2021 | Tsuruma ................... H02J 3/38 |
| 2022/0321041 A1* | 10/2022 | Ebrahimzadehveshareh ............... H02J 3/381 |

FOREIGN PATENT DOCUMENTS

| | | |
|---|---|---|
| JP | 2015-211617 A | 11/2015 |
| JP | 5830941 B2 | 12/2015 |
| JP | 6084863 B2 | 2/2017 |
| JP | 2019-4571 A | 1/2019 |
| JP | 2019-80476 A | 5/2019 |
| WO | WO-2013/008413 A1 | 1/2013 |

OTHER PUBLICATIONS

Toshiaki Kikuma, "Overcurrent Control Scheme for Virtual Synchronous Generator", The Institute of Electrical Engineers of Japan, IEEJ, Sep. 12, 2018, 2 pages.
U.S. Appl. No. 17/909,213, filed Aug. 6, 2020, Kenichi Suzuki et al.

\* cited by examiner

VECTOR DIAGRAM WITH D-AXIS BEING A REFERENCE

VECTOR DIAGRAM WITH D'-AXIS BEING A REFERENCE

SYSTEM INTERCONNECTION POWER CONVERSION DEVICE

TECHNICAL FIELD

The present invention relates to a control method for suppressing an overcurrent caused by a system accident (or a grid accident) etc. in a system interconnection power conversion device (or a grid interconnection power conversion device) that controls a virtual synchronous generator simulating a synchronous generator.

BACKGROUND ART

Non-Patent Document 1 discloses, as a technique for controlling a virtual synchronous generator by a voltage control system, a method for keeping an output current within a certain constant value by correcting a deviation (a difference) between a voltage command value and a voltage detection value so that the deviation falls within a certain fixed value.

Patent Document 1 discloses a technique for controlling a virtual synchronous generator by a current control system. Because of the current control system, by limiting a current command value, an overcurrent can be prevented.

In a case of the method of Non-Patent Document 1, since it is not possible to control a current to a specified current value, an output current flowing by a main circuit condition (a filter constant, a system impedance, etc.) is changed.

In a case of the method of Patent Document 1, if the current command value is limited, a vector that is different from a command value vector calculated based on a virtual synchronous impedance model is output. Because of this, a synchronizing power generated by action or working of the virtual synchronous impedance cannot be expected.

From the above, in the grid interconnection power conversion device that controls the virtual synchronous generator, a challenge is to continue an operation while suppressing the overcurrent caused by a short circuit accident etc. of the grid and to possess the synchronizing power generated by action or working of the virtual synchronous impedance.

CITATION LIST

Patent Document

Patent Document 1: Japanese Patent No. 6084863
Patent Document 2: Japanese Patent No. 5830941

Non-Patent Document

Non-Patent Document 1: "Overcurrent control Scheme for Virtual Synchronous Generator" Heisei 30 (2018), IEEJ (The institute of Electrical. Engineers of Japan), B section (Power and Energy)

SUMMARY OF THE INVENTION

The present invention was made in view of the above problem and challenge. As one aspect of the present invention, a grid interconnection power conversion device interconnecting a DC power supply through a DC/AC conversion device, an LC filter and a transformer and performing a control of a virtual synchronous generator, the grid interconnection power conversion device comprises: an internal induced voltage calculation unit configured to calculate an internal induced voltage on the basis of an output current detection value, an effective value of an AC voltage detection value and a command value of an AC voltage effective value; a VSG model configured to determine, on the basis of the internal induced voltage, the output current detection value and a power reference value, an angular frequency simulating a synchronous generator; a Zs compensation unit configured to simulate drop of a voltage caused by an internal impedance of the synchronous generator on the basis of the internal induced voltage, a grid voltage detection value and the output current detection value and calculate a grid voltage command value; an output voltage control unit configured to perform a voltage control so that the grid voltage detection value becomes the grid voltage command value and output a PWM control command value; and a PWM control unit configured to output a gate command of the DC/AC conversion device on the basis of the PWM control command value and the angular frequency, wherein the Zs compensation unit has a Zs calculation unit configured to calculate an output current phase from the output current detection value, limit the output current phase so that the output current phase is within an effective range by a phase limiter and calculate a corrected virtual synchronous impedance on the basis of a limited output current phase, the internal induced voltage, the grid voltage detection value and a current limit value; a $Vz_s$ calculation unit configured to calculate a voltage drop on the basis of a predetermined virtual synchronous impedance and the output current detection value in a normal state and calculate the voltage drop on the basis of the corrected virtual synchronous impedance and the output current detection value at a time of an occurrence of an overcurrent; and a subtracter configured to output, as the grid voltage command value, a value obtained by subtracting the voltage drop from the internal induced voltage.

As one aspect of the present invention, the phase limiter is configured to calculate a D'-axis that is a midpoint of an upper limit value and a lower limit value of the phase limiter, perform a coordinate conversion of the output current phase with the D'-axis being a reference, limit the output current phase with the D'-axis being the reference, and perform a coordinate conversion of a limited output current phase with an original D-axis being a reference.

As one aspect of the present invention, the phase limiter is configured to set, as the D'-axis, a phase obtained by subtracting $5\pi/4$ from the upper limit value of the phase limiter or a phase obtained by subtracting $3\pi/4$ from the lower limit value of the phase limiter.

As one aspect of the present invention, the corrected virtual synchronous impedance is expressed by the following expression (5).

[Expression 5]

$$\begin{bmatrix} r' \\ x' \end{bmatrix} = \frac{1}{I_{lim}} \begin{bmatrix} \cos\theta & \sin\theta \\ -\sin\theta & \cos\theta \end{bmatrix} \begin{bmatrix} E_d - V_d \\ E_q - V_q \end{bmatrix} \quad (5)$$

Where, θ is expressed by the following expression (7).

[Expression 7]

$$\tan^{-1}\left(\frac{-(E_d - V_d)}{E_q - V_q}\right) \le \theta \le \tan^{-1}\left(\frac{E_q - V_q}{E_d - V_d}\right) \quad (7)$$

r', x': the corrected virtual synchronous impedance
Ilim: the current limit value θ: the output current phase Ed: a d-axis component of the internal induced voltage Eq: a q-axis component of the internal induced voltage Vd: a d-axis component of the grid voltage detection value Vq: a q-axis component of the grid voltage detection value As one aspect of the present invention, the Zs calculation unit is configured to set the current limit value as a fixed value, and the $Vz_s$ calculation unit is configured to, when the output current detection value is lower than the current limit value, as the normal state, calculate the voltage drop on the basis of the virtual synchronous impedance and the output current detection value, and when the output current detection value is the current limit value or greater, as the time of the occurrence of the overcurrent, calculate the voltage drop on the basis of the corrected virtual synchronous impedance and the output current detection value.

As another aspect of the present invention, the Zs calculation unit is configured to calculate a magnitude of an output current vector from the output current detection value, and set, as the current limit value, a value limited to a current that can output the magnitude of the output current vector, and the $Vz_s$ calculation unit is configured to compare the virtual synchronous impedance and the corrected virtual synchronous impedance, and when the virtual synchronous impedance is greater, as the normal state, calculate the voltage drop on the basis of the virtual synchronous impedance and the output current detection value, and when the corrected virtual synchronous impedance is greater, as the time of the occurrence of the overcurrent, calculate the voltage drop on the basis of the corrected virtual synchronous impedance and the output current detection value.

As another aspect of the present invention, the Zs compensation unit has an overcurrent judgment unit configured to judge whether the normal state or the time of the occurrence of the overcurrent, the overcurrent judgment unit has an overcurrent suppressing operation judgment unit configured to judge an overcurrent suppressing operation on the basis of an output current judgment by comparison between a full-wave rectification maximum value of the output current detection value and an overcurrent judgment level; an overcurrent returning operation judgment unit configured to estimate, on the basis of the internal induced voltage and the grid voltage detection value, an output current estimation value when returning from the corrected virtual synchronous impedance to the virtual synchronous impedance and judge an overcurrent returning operation on the basis of a first estimation current judgment by comparison between a square root of sum of squares of the output current estimation value and a current judgment level; and a latch circuit configured to, when the overcurrent suppressing operation is judged by the overcurrent suppressing operation judgment unit, hold an overcurrent suppressing operation state, and when the overcurrent returning operation is judged by the overcurrent returning operation judgment unit, hold an overcurrent returning operation state.

As one aspect of the present invention, the overcurrent returning operation judgment unit is configured to judge the overcurrent returning operation by an AND condition of a voltage judgment by comparison between a square root of sum of squares of a moving average value of the grid voltage detection value between power supply cycles and a voltage judgment level and the first estimation current judgment.

As one aspect of the present invention, the overcurrent suppressing operation judgment unit is configured to judge the overcurrent suppressing operation by an OR condition of a second estimation current judgment by comparison between the square root of sum of squares of the output current estimation value and the overcurrent judgment level and the output current judgment.

As another aspect of the present invention, a grid interconnection power conversion device interconnecting a DC power supply through a DC/AC conversion device, an LC filter and a transformer and performing a control of a virtual synchronous generator, the grid interconnection power conversion device comprises: an internal induced voltage calculation unit configured to calculate an internal induced voltage on the basis of an output current detection value, an effective value of an AC voltage detection value and a command value of an AC voltage effective value; a VSG model configured to determine, on the basis of the internal induced voltage, the output current detection value and. a power reference value, an angular frequency simulating a synchronous generator; a Zs compensation unit configured to simulate drop of a voltage caused by an internal impedance of the synchronous generator on the basis of the internal induced voltage, a grid voltage detection value and the output current detection value and calculate a grid voltage command value; an output voltage control unit configured to perform a voltage control so that the grid voltage detection value becomes the grid voltage command value and output a PWM control command value; and a PWM control unit configured to output a gate command of the DC/AC conversion device on the basis of the PWM control command value and the angular frequency, wherein the Zs compensation unit has a Zs calculation unit configured to calculate an output current phase from an output current estimation value, limit the output current phase so that the output current phase is within an effective range and calculate a corrected virtual synchronous impedance on the basis of a limited output current phase, the internal induced voltage, the grid voltage detection value and a current limit value; a $Vz_s$ calculation unit configured to calculate a voltage drop on the basis of the corrected virtual synchronous impedance and the output current detection value in a normal state and also at a time of an occurrence of an overcurrent; and a subtracter configured to output, as the grid voltage command value, a value obtained by subtracting the voltage drop from the internal induced voltage.

As one aspect of the present invention, the output current estimation value is expressed by the following expression (8).

[Expression 8]

$$\begin{bmatrix} I_d \\ I_q \end{bmatrix} = \frac{1}{r^2 + x^2} \begin{bmatrix} r & x \\ -x & r \end{bmatrix} \begin{bmatrix} E_d - V_d \\ E_q - V_q \end{bmatrix} \quad (8)$$

Id, Iq: the output current estimation value r, x: virtual synchronous impedance

Ed: a d-axis component of the internal induced voltage

Eq: a q-axis component of the internal induced voltage

Vd: a d-axis component of the grid voltage detection value

Vq: a q-axis component of the grid voltage detection value

According to the present invention, in the grid interconnection power conversion device that controls the virtual synchronous generator, it is possible to continue the operation while suppressing the overcurrent caused by the short circuit accident of the grid etc. and to possess the synchronizing power generated by action or working of the virtual synchronous impedance.

EMBODIMENTS FOR CARRYING OUT THE INVENTION

Embodiments 1 to 7 of a system interconnection power conversion device (or a grid interconnection power conversion device) according to the present invention will be described in detail below with reference to FIGS. 1 to 12.

[Embodiment 1]

Figure 1:
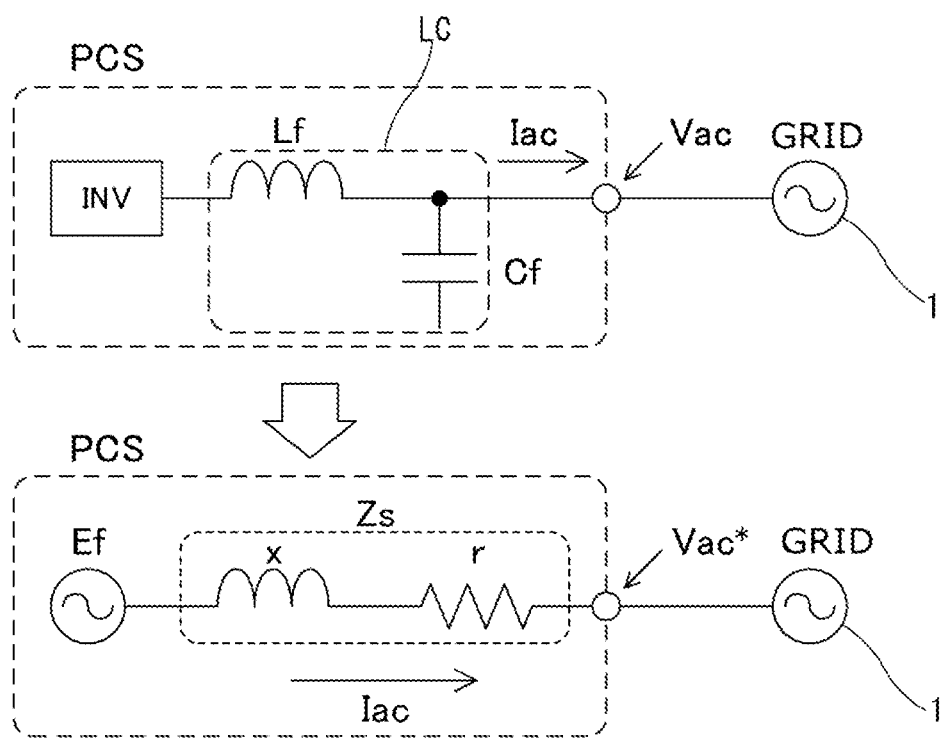
FIG. 1 is a drawing showing a virtual impedance model of a system interconnection power conversion device (or a grid interconnection power conversion device).

FIG. 1 shows a virtual impedance model of a system interconnection power conversion device (or a grid interconnection power conversion device) used for a PCS (Power Conversion System). As shown in FIG. 1, the grid interconnection power conversion device has a DC/AC conversion device INV and an LC filter LC (a reactor Lf and a capacitor Cf), and is interconnected to a system (or a grid) 1.

The grid, interconnection power conversion device performs a voltage control so that a grid voltage detection value Vac after the LC filter LC coincides with a grid voltage command value Vac* obtained by subtracting a voltage drop, which is caused by the fact that an output current Iac flows through a virtual synchronous impedance Zs, from an internal induced voltage Ef.

Figure 2:
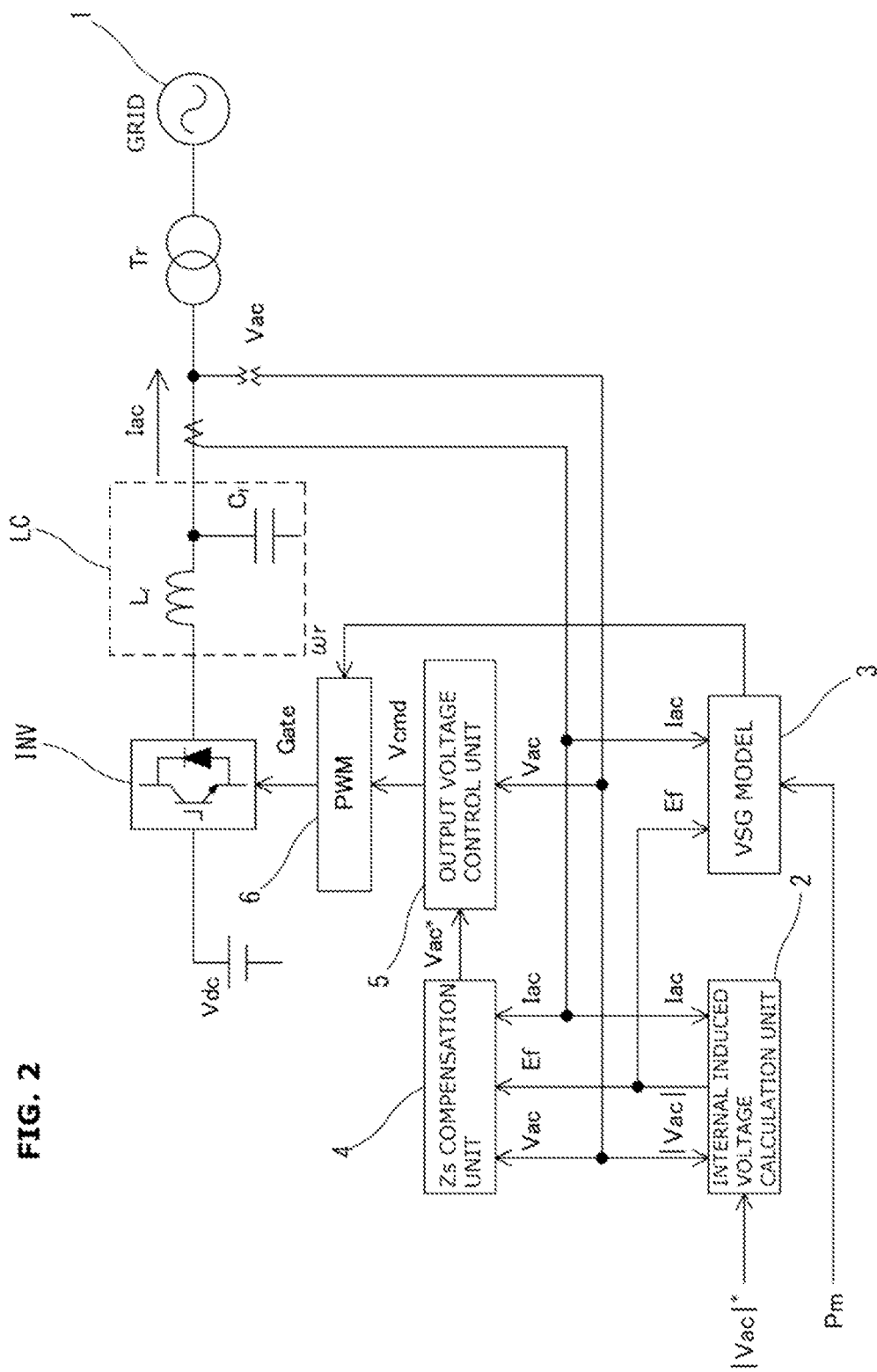
FIG. 2 is a schematic diagram showing a general configuration of the grid interconnection power conversion device.

FIG. 2 is a schematic diagram showing a general configuration of the grid interconnection power conversion device according to the present embodiment 1. As shown in FIG. 2, as a main circuit configuration of the grid interconnection power conversion device, a DC power supply Vdc such as a storage battery is interconnected to the grid 1 through the DC/AC conversion device INV formed by IGBTs etc., the LC filter LC and a transformer Tr. An output current detection value Iac between the LC filter LC and the transformer Tr and the grid voltage detection value Vac are detected, and are output to an after-mentioned control block.

The control block of the grid interconnection power conversion device according to the present embodiment 1 has, as shown in FIG. 2, an internal induced voltage calculation unit 2, a VSG model 3, a Zs compensation unit 4, an output voltage control unit 5 and a PWM control unit 6.

The internal induced voltage calculation unit 2 inputs a command value |Vac|* of an AC voltage effective value, an effective value |Vac| of an AC voltage detection value and the output current detection value Iac, and calculates the internal induced voltage Ef The VSG model 3 inputs the internal induced voltage Ef, the output current detection value Iac and a power reference value Pm, and determines an angular frequency ωr simulating a synchronous generator.

The Zs compensation unit 4 inputs the grid voltage detection value Vac, the output current detection value Iac and the internal induced voltage Ef, simulates drop of a voltage caused by an internal impedance of the synchronous generator, and outputs the grid voltage command value Vac*.

The output voltage control unit 5 inputs the grid voltage detection value Vac and the grid voltage command value Vac*, performs a control so that the grid voltage detection value Vac becomes the grid voltage command value Vac*, and outputs a PWM control command value Vcmd. The PWM control unit 6 inputs the PWM control command value Vcmd and the angular frequency ωr, and outputs a gate command Gate to a switching element such as the IGBT of the DC/AC conversion device INV.

Since the internal induced voltage calculation unit 2, the VSG model 3, the output voltage control unit 5 and the PWM control unit 6 are not directly related to the present invention, their detailed descriptions are omitted here.

Figure 3:
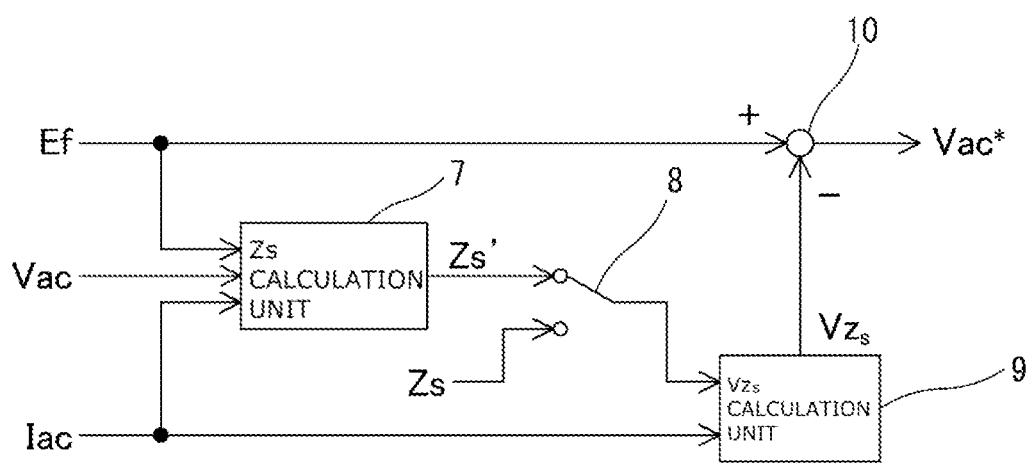
FIG. 3 is a schematic diagram showing a Zs compensation unit of embodiments 1 to 7.

The Zs compensation unit 4 has, as shown in FIG. 3, a Zs calculation unit 7, a switch 8, a $Vz_s$ calculation unit 9 and a subtracter 10.

The Zs calculation unit 7 calculates a corrected virtual synchronous impedance Zs' required to suppress an output current upon occurrence of an overcurrent. The switch 8 normally outputs a predetermined virtual synchronous impedance Zs, but outputs the corrected virtual synchronous impedance Zs' upon occurrence of the overcurrent. Judgment of the normal state and the occurrence of the overcurrent is made, for instance, by comparison between the output current detection value Iac and an overcurrent level (a threshold value).

The $Vz_s$ calculation unit 9 calculates a voltage drop $Vz_s$ generated by the output current detection value Iac and the virtual synchronous impedance Zs or the corrected virtual synchronous impedance Zs'. The subtracter 10 subtracts the voltage drop $Vz_s$ from the internal induced voltage Ef, and calculates the grid voltage command value Vac* to be output by the grid interconnection power conversion device.

Figure 4:
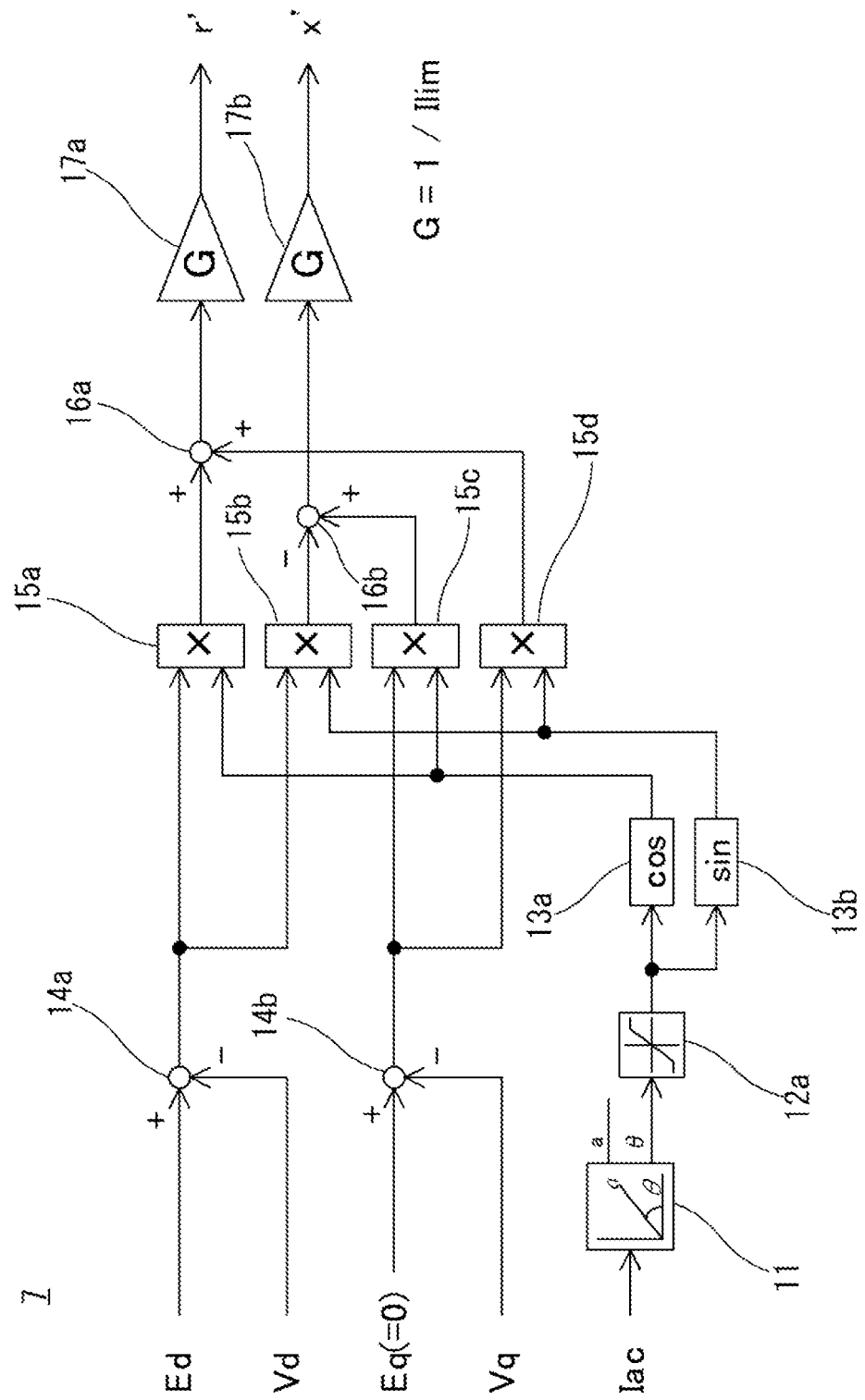
FIG. 4 is a schematic diagram showing a Zs calculation unit of the embodiments 1 and 2.

FIG. 4 is a block diagram showing the Zs calculation unit 7. The Zs calculation unit 7 has a polar coordinate conversion unit 11, a phase limiter 12a, a cos unit 13a, a sin unit 13b, subtracters 14a and 14b, multipliers 15a to 15d, an adder 16a, a subtracter 16b and gain multipliers 17a and 17b.

The polar coordinate conversion unit 11 calculates an output current phase θ from the output current detection value Iac. The phase limiter 12a limits the output current phase θ so that the output current phase θ is within an effective range. The cos unit 13a outputs a cos θ, and the sin unit 13b outputs a sin θ.

The subtracter 14a subtracts a d-axis component Vd of the grid voltage detection value Vac from a d-axis component Ed of the internal induced voltage Ef, and outputs Ed-Vd. The subtracter 14b subtracts a q-axis component Vq of the grid voltage detection value Vac from a q-axis component Eq of the internal induced voltage Ef, and outputs Eq-Vq.

The multiplier 15a multiplies the output of the subtracter 14a by a cos θ, and outputs (Ed-Vd) cos θ. The multiplier 15b multiplies the output of the subtracter 14a by a sin θ, and outputs (Ed-Vd) sin θ. The multiplier 15c multiplies the output of the subtracter 14b by a cos θ, and outputs (Eq-Vq) cos θ. The multiplier 15d multiplies the output of the subtracter 14b by a sin θ, and outputs (Eq-Vq) sin θ.

The adder 16a adds the output (Eq-Vq) sin θ of the multiplier 15d to the output (Ed-Vd) cos θ of the multiplier 15a. The subtracter 16b subtracts the output (Ed-Vd) sin θ of the multiplier 15b from the output (Eq-Vq) cos θ of the multiplier 15c.

The gain multiplier 17a multiplies the output of the adder 16a by a gain G (=1/Ilim), and outputs it as r'. The gain multiplier 17b multiplies the output of the subtracter 16b by a gain G (=1/Ilim), and outputs it as x'. (r', x') becomes the corrected virtual synchronous impedance Zs'.

The grid interconnection power conversion device performs the voltage control so that the grid voltage detection value Vac after the LC filter LC coincides with the grid voltage command value Vac* obtained by subtracting the voltage drop, which is caused by the fact that the output current Iac flows through the virtual synchronous impedance Zs, from the internal induced voltage Ef.

In the normal state, the virtual synchronous impedance Zs (r and x) according to the synchronous generator to be simulated is set, and the grid voltage command value Vac* is determined by the set virtual synchronous impedance Zs.

In a case where, due to a grid accident etc., the overcurrent occurs in the grid interconnection power conversion device when the grid voltage command value Vac* determined by the virtual synchronous impedance Zs has been output, by switching the virtual synchronous impedance Zs to the corrected virtual synchronous impedance Zs' (r' and x') required to limit the output current detection value Iac to a current limit value Ilim which the DC/AC conversion device INV can output, the overcurrent is suppressed.

A calculation method of the corrected virtual synchronous impedance Zs' required to suppress the overcurrent will be described below. From the impedance model of FIG. 1, the voltage drop $Vz_s$ (=ZsIac) generated by the virtual synchronous impedance Zs is the following expression (1).

[Expression 1]

$$\dot{Z}_s I_{ac} = \dot{E}_f - \dot{V}_{ac} \qquad (1)$$

When the expression (1) is treated on DQ coordinates and expressed as a determinant, the expression (1) becomes the following expression (2).

[Expression 2]

$$\begin{bmatrix} r \\ x \end{bmatrix} = \frac{1}{I_d^2 + I_q^2} \begin{bmatrix} I_d & I_q \\ -I_q & I_d \end{bmatrix} \begin{bmatrix} E_d - V_d \\ E_q - V_q \end{bmatrix} \qquad (2)$$

Here, the virtual synchronous impedance Zs, the output current detection value Iac, the grid voltage detection value Vac and the internal induced voltage Ef are expressed by the following expression (3).

[Expression 3]

$$\dot{Z}_s = r + jx, \; I_{ac} = I_d + jI_q, \; \dot{V}_{ac} = V_d + jV_q, \; \dot{E}_f = E_d + jE_q \qquad (3)$$

When suppressing the output current, only a magnitude of an output current vector is limited without changing a phase of the output current vector. A d-axis component Id and a q-axis component Iq of the output current detection value Iac after the limitation and the output current phase θ become the following expression (4). Here, Ilim indicates the current limit value, and Id_det/Iq_det indicates d-axis component/q-axis component of the output current detection value.

[Expression 4]

$$I_d = I_{lim} \cos\theta, \; I_q = I_{lim} \sin\theta, \; \theta = \tan^{-1}\left(\frac{I_{d\_det}}{I_{q\_det}}\right) \qquad (4)$$

From the above expressions, the corrected virtual synchronous impedance Zs' (r' and x') required to limit the output current to the current limit value Ilim can be determined by the following expression (5).

[Expression 5]

$$\begin{bmatrix} r' \\ x' \end{bmatrix} = \frac{1}{I_{lim}} \begin{bmatrix} \cos\theta & \sin\theta \\ -\sin\theta & \cos\theta \end{bmatrix} \begin{bmatrix} E_d - V_d \\ E_q - V_q \end{bmatrix} \qquad (5)$$

FIG. 4 shows the above contents in a block diagram. It is noted that by defining an internal phase with the internal induced voltage Ef being a reference, Eq becomes 0 (Eq=0) and can be simplified.

Next, the phase limiter 12a will be described. As described above, when calculating the corrected virtual synchronous impedance Zs', although the output current phase θ of the output current detection value Iac is used, in order to use it as the virtual impedance model of FIG. 1, it is necessary to limit the output current phase θ so that the output current phase θ is within an effective range.

Figure 5:
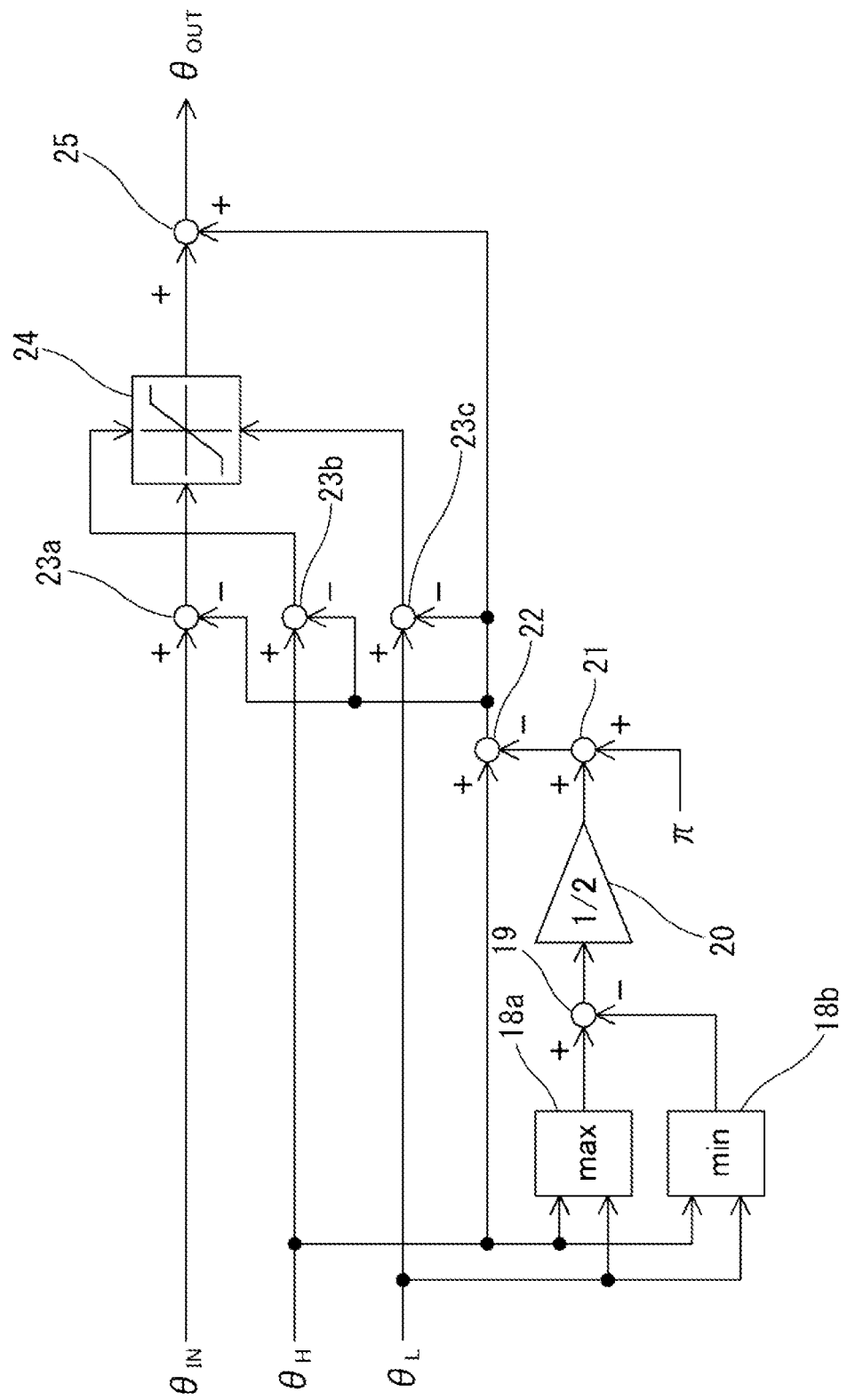
FIG. 5 is a schematic diagram showing a phase limiter of the embodiment 1.

FIG. 5 is a schematic diagram showing the phase limiter 12a of the embodiment 1. As shown in FIG. 5, the phase limiter 12a has a maximum value output unit 18a, a minimum value output unit 18b, a subtracter 19, a multiplier 20, an adder 21, a subtracter 22, subtracters 23a, 23b and 23c, a limiter 24 and an adder 25. $\theta_{IN}$ indicates a phase input to the phase limiter 12a, and $\theta_{OUT}$ indicates a phase output from the phase limiter 12a.

The maximum value output unit 18a outputs a maximum value of an upper limit value $\theta_H$ and a lower limit value $\theta_L$ of the phase limiter. The minimum value output unit 18b outputs a minimum value of the upper limit value $\theta_H$ and the lower limit value $\theta_L$ of the phase limiter. The subtracter 19 determines a deviation (a difference) between the maximum value and the minimum value. The multiplier 20 determines a phase that is half of the effective range of the output current phase θ by multiplying the deviation by ½.

The adder 21 determines a phase difference from the upper limit value $\theta_H$ of the phase limiter to a D'-axis by adding π to the phase that is half of the effective range of the phase θ. The subtracter 22 determines a phase difference θax from a D-axis to the D'-axis by subtracting the above phase difference from the upper limit value $\theta_H$ of the phase limiter.

The subtracters 23a, 23b and 23c subtract an output of the subtracter 22 from the phases $\theta_{IN}$, $\theta_H$ and $\theta_L$, and convert these phases $\theta_{IN}$, $\theta_H$ and $\theta_L$ with the D'-axis being a reference.

The limiter 24 limits an output current phase $\theta_{IN}'$ converted with the D'-axis being the reference by upper and lower limit values $\theta_H'$ and $\theta_L'$ converted with the D'-axis being the reference. The adder 25 adds an output of the subtracter 22 to an output of the limiter 24, and converts the limited output current phase with the D-axis being a reference. An output of the adder 25 is $\theta_{OUT}$.

Figure 6A:
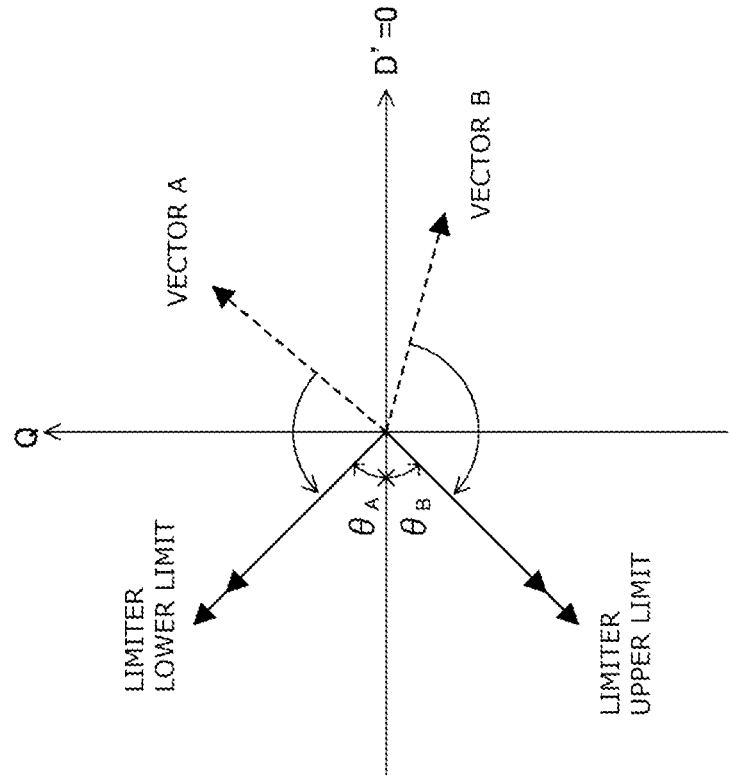
FIGS. 6A and 6B are vector diagrams with a D-axis and a D'-axis being references.
Figure 6B:
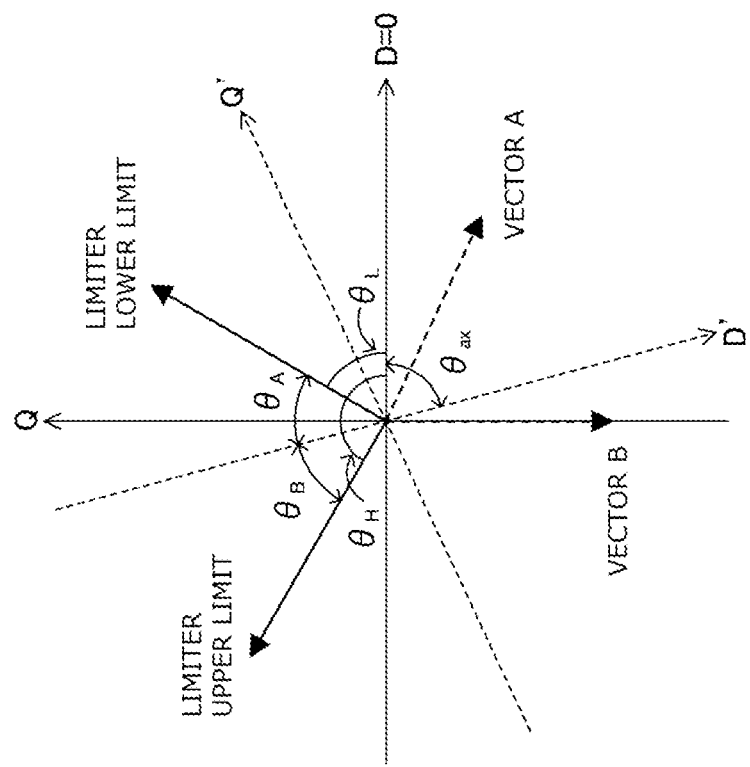

FIG. 6A shows a vector diagram with the D-axis being a reference. FIG. 6B shows a vector diagram with the D'-axis being a reference. As shown in Fig. 6A, the D'-axis whose phase difference from the lower limit value $\theta_L$ of the limiter is $\theta_A$ and whose phase difference from the upper limit value $\theta_H$ of the limiter is $\theta_B$ is provided. This D'-axis is defined in the middle of the upper limit value $\theta_H$ and the lower limit value $\theta_L$ of the limiter so that $\theta_A$ is $\theta_B$ ($\theta_A = \theta_B$).

A reference point (a point of 0) of the D'-axis is set to a point that is symmetrical to a midpoint of the upper limit value $\theta_H$ and the lower limit value $\theta_L$ of the limiter with a phase being advanced by $\pi$. Each phase is converted with the D-axis being a reference by calculating the phase difference $\theta$ax between this D'-axis and the D-axis from the lower limit value $\theta_L$ and the upper limit value $\theta_H$ of the limiter.

By performing the limit process on the basis of phase information with the D'-axis being the reference, if the vector before the limitation is out of the range, the vector is limited to either one, which is closer to the vector, of the upper limit value $\theta_H$ or the lower limit value $\theta_L$.

More specifically, a vector A is limited to the limiter lower limit value $\theta_L$, while a vector B is limited to the limiter upper limit value $\theta_H$. The phase information after the limitation is converted into respective phases with the original D-axis being the reference by adding the phase difference $\theta$ax.

In the above description, although the D'-axis is calculated with the limiter upper limit value $\theta_H$ being a reference, the D'-axis could be calculated with the limiter lower limit value $\theta_L$ being a reference.

As described above, according to the present embodiment 1, even if the overcurrent occurs in the DC/AC conversion device due to a short circuit accident etc. of the grid, it is possible to continue an operation with the current being limited to the current limit value which the DC/AC conversion device can output. Further, since a synchronizing power generated by action or working of the virtual synchronous impedance is still possessed, it is possible to synchronize the device with other voltage sources even during the current suppression.

In addition, when the output current phase to be limited is out of the effective range, since the output current phase is limited to either one, whose phase difference is smaller, of the upper limit value or the lower limit value of the limiter, a change of the phase by the limiter becomes small.

[Embodiment 2]

Figure 7:
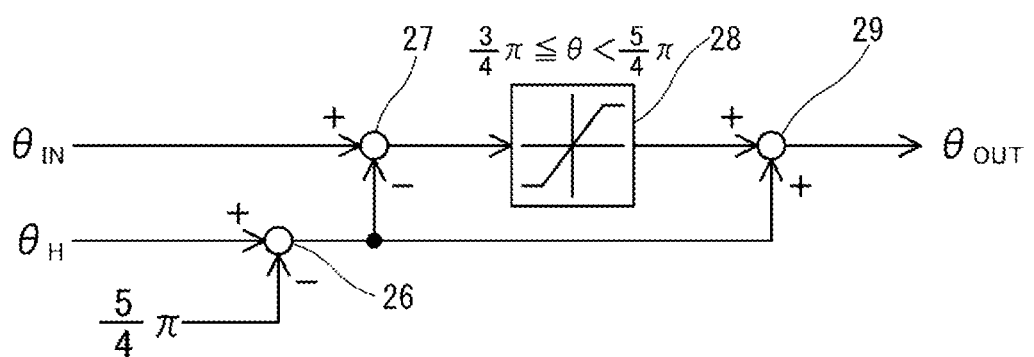
FIG. 7 is a schematic diagram showing a phase limiter of the embodiment 2.

In an embodiment 2, the phase limiter 12a of the embodiment 1 is simplified. FIG. 7 shows the phase limiter 12a of the embodiment 2. As shown in FIG. 7, the phase limiter 12a of the present embodiment 2 has a subtracter 26, a subtracter 27, a limiter 28 and an adder 29.

The subtracter 26 subtracts $5\pi/4$ from the upper limit value $\theta_H$ of the phase limiter. The subtracter 27 subtracts an output of the subtracter 26 from the phase $\theta_{IN}$, and converts the phase $\theta_{IN}$ with the D'-axis being a reference. The limiter 28 limits the phase $\theta_{IN}$ converted with the D'-axis being the reference as $3\pi/4 \leq \theta < 5\pi/4$. The adder 29 converts an output of the limiter 28 with the D-axis being a reference. An output of the adder 29 is the phase $\theta_{OUT}$.

In order to simulate the corrected virtual synchronous impedance Zs', the corrected virtual synchronous impedance Zs' determined by the expression (5) must be positive. Although instantaneous output current phase information is necessary to suppress the overcurrent, if the corrected virtual synchronous impedance Zs' is calculated on the basis of phase information extracted from an instantaneous current when the output current is disturbed due to a grid accident, a load change and the like, the corrected virtual synchronous impedance Zs' may be a negative value. Therefore, the limiter is provided for the extracted output current phase $\theta$.

A condition that the corrected virtual synchronous impedance r' and x' become positive values from an equation of the corrected virtual synchronous impedance Zs' of the expression (5) is the following expression (6).

[Expression 6]

$$\begin{cases} (E_d - V_d)\cos\theta + (E_q - V_q)\sin\theta \geq 0 \\ -(E_d - V_d)\sin\theta + (E_q - V_q)\cos\theta \geq 0 \end{cases} \quad (6)$$

From the expression (6), the output current phase $\theta$ needs to be limited to within a range of the following expression (7).

[Expression 7]

$$\tan^{-1}\left(\frac{-(E_d - V_d)}{E_q - V_q}\right) \leq \theta \leq \tan^{-1}\left(\frac{E_q - V_q}{E_d - V_d}\right) \quad (7)$$

Since denominator and numerator of the upper limit value and the lower limit value are opposite in the expression (7), a deviation (a difference) between the upper limit value and the lower limit value is fixed at $\pi/2$. Therefore, because of $\theta_A = \theta_B = \pi/4$, a phase difference from the upper limit value $\theta_H$ to the D'-axis becomes $5\pi/4$. Here, although a method for calculating the D'-axis with the upper limit value $\theta_H$ being a reference has been described, the D'-axis could be calculated with the lower limit value $\theta_L$ being a reference. In the case where the lower limit value $\theta_L$ is the reference, the phase difference becomes $3\pi/4$.

From the above, a configuration of the phase limiter (FIG. 5) of the embodiment 1 can be simplified as shown in FIG. 7.

As described above, the present embodiment 2 can obtain the same working and effect as those of the embodiment 1. Further, the phase limiter can be configured with a simpler configuration than that of the embodiment 1.

[Embodiment 3]

Figure 8:
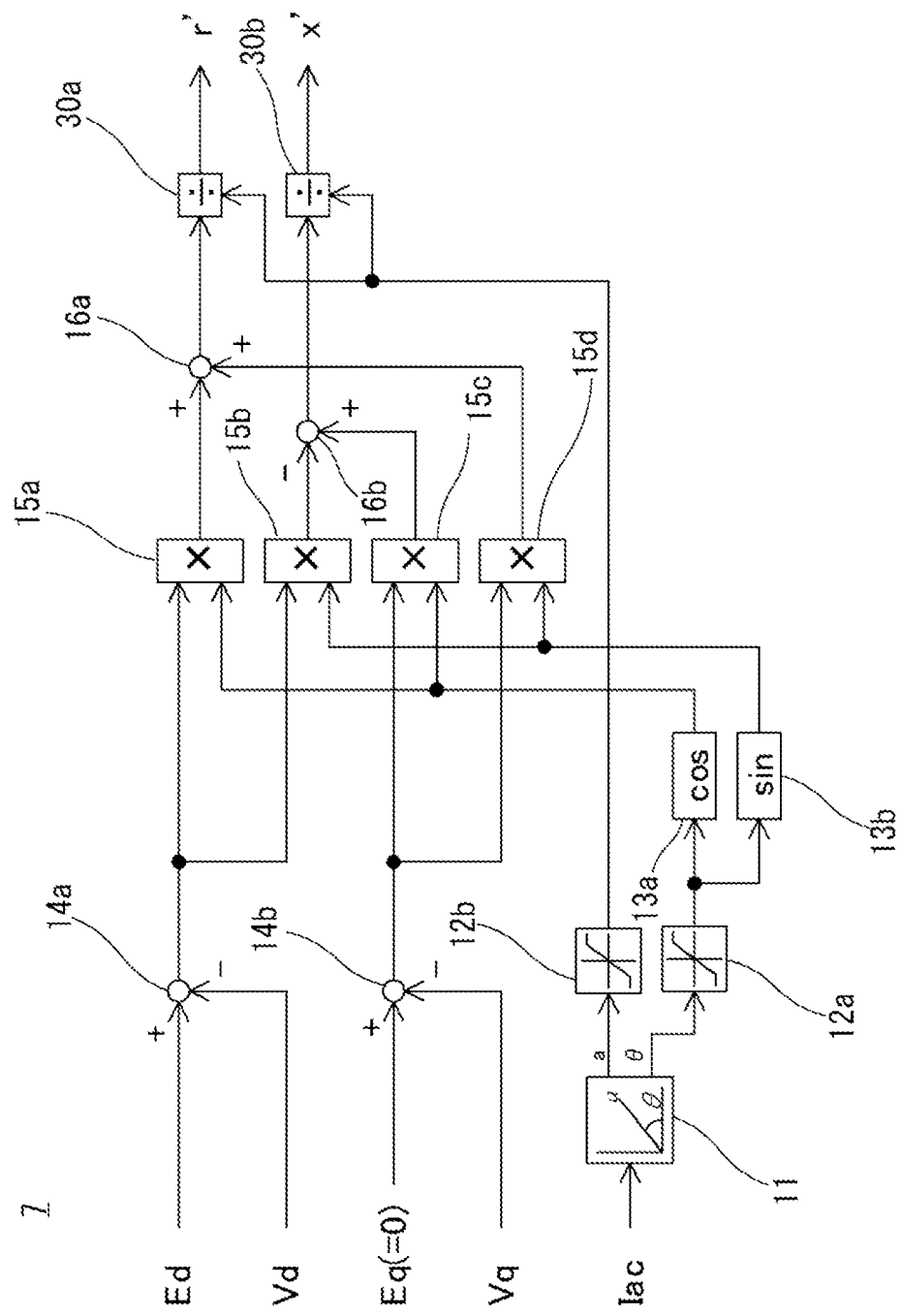
FIG. 8 is a schematic diagram showing a Zs calculation unit of the embodiment 3.

An embodiment 3 is the same as the embodiments 1 and 2 except for the Zs calculation unit 7. FIG. 8 shows the Zs calculation unit 7 of the present embodiment 3. Different points from the embodiments 1 and 2 will be described below.

In the embodiments 1 and 2, the current limit value Ilim is a fixed value. However, in the present embodiment 3, a current limiter 12b for limiting a magnitude (an amplitude a) of the output current detection value Iac is provided. Further, instead of the gain multipliers 17a and 17b, dividers 30a and 30b are provided, and divide outputs of the adder 16a and the subtracter 16b by a limited output current detection value output from the current limiter 12b.

In the embodiments 1 and 2, the predetermined virtual synchronous impedance Zs and the corrected virtual synchronous impedance Zs' calculated by the Zs calculation unit 7 are switched by the detection of the overcurrent.

In contrast to this, in the present embodiment 3, as the current limit value Ilim, a value obtained by limiting the magnitude (the amplitude a) of the output current detection value Iac by the overcurrent level is used. Then, the switch 8 in FIG. 3 compares the predetermined virtual synchronous impedance Zs and the corrected virtual synchronous impedance Zs' calculated by the Zs calculation unit 7, and selects the virtual synchronous impedance having a greater impedance value.

As described above, according to the present embodiment 3, the same working and effect as those of the embodiments 1 and 2 are obtained. Further, since an amount of change between the virtual synchronous impedance Zs and the corrected virtual synchronous impedance Zs' becomes small when the virtual synchronous impedance is switched, a current change during the overcurrent suppression operation becomes gentle, then an overshoot can be suppressed. Furthermore, since the judgment of the overcurrent becomes unnecessary, the circuit configuration is simplified, and adjustment of the current limit value is unnecessary.

[Embodiment 4]

When the above expression (1) is solved for the current, the following expression (8) is obtained.

[Expression 8]

$$\begin{bmatrix} I_d \\ I_q \end{bmatrix} = \frac{1}{r^2 + x^2} \begin{bmatrix} r & x \\ -x & r \end{bmatrix} \begin{bmatrix} E_d - V_d \\ E_q - V_q \end{bmatrix} \quad (8)$$

From the expression (8), the current flowing when the set virtual synchronous impedance Zs is simulated can be estimated.

The output current detection value Iac used in the configurations of the embodiments 1 to 3 is replaced with output current estimation values Id and Iq calculated by the expression (8), and these values are used.

Figure 9:
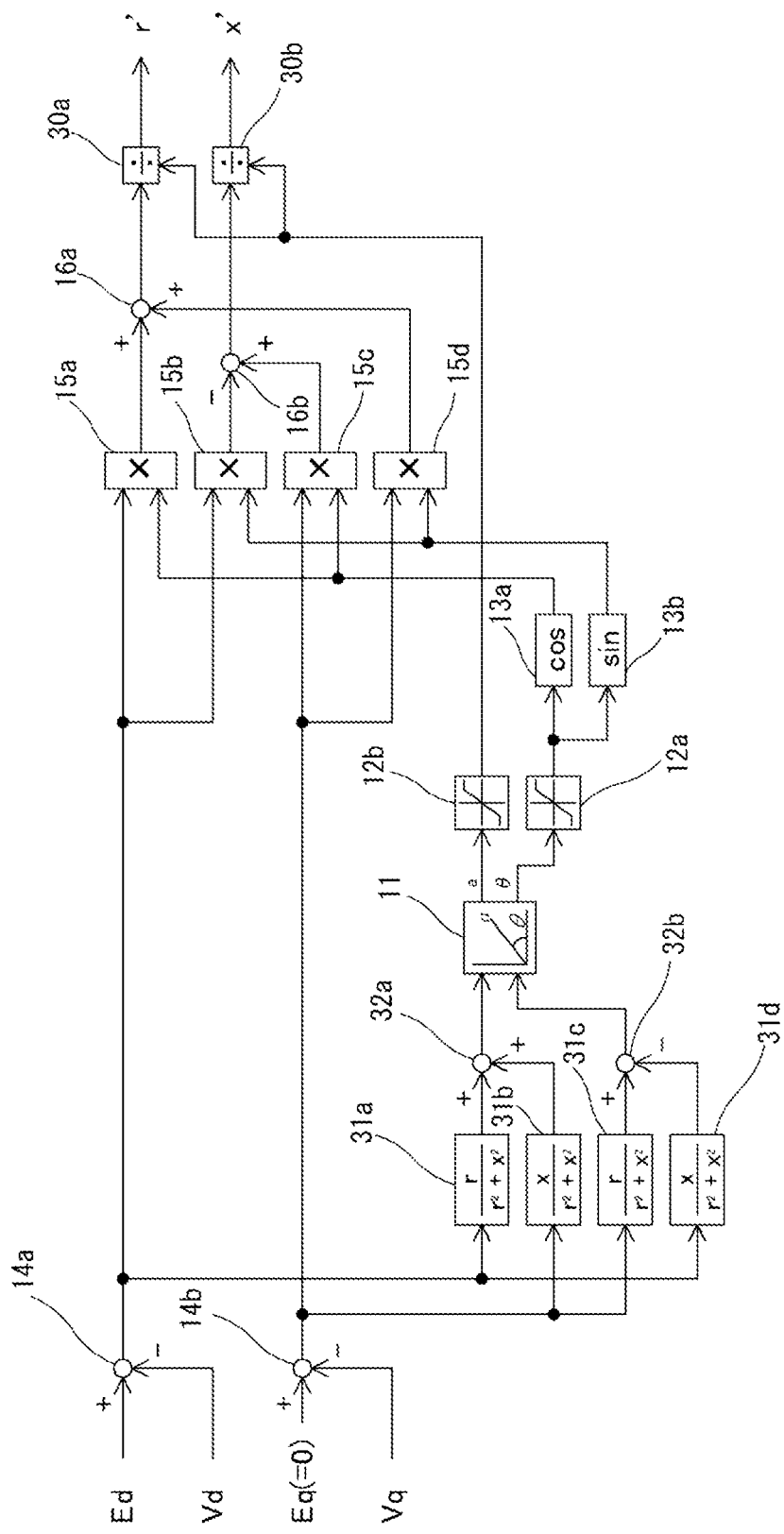
FIG. 9 is a schematic diagram showing a Zs calculation unit of the embodiment 4.

FIG. 9 shows the Zs calculation unit 7 of an embodiment 4. Different points from the embodiment 3 will be described below.

A multiplier 31a multiplies the output (Ed-Vd) of the subtracter 14a by $r/r^2+x^2$. A multiplier 31b multiplies the output (Eq-Vq) of the subtracter 14b by $x/r^2+x^2$. A multiplier 31c multiplies the output (Eq-Vq) of the subtracter 14b by $r/r^2+x^2$. A multiplier 31d multiplies the output (Ed-Vd) of the subtracter 14a by $x/r^2+x^2$.

An adder 32a adds an output of the multiplier 31b to an output of the multiplier 31a. A subtracter 32b subtracts an output of the multiplier 31d from an output of the multiplier 31c. Outputs of the adder 32a and the subtracter 32b are the output current estimation values Id and Iq respectively. In the present embodiment 4, these output current estimation values Id and Iq are output to the polar coordinate conversion unit 11.

When calculating the corrected virtual synchronous impedance on the basis of the output current estimation values Id and Iq, in the normal state (there is no limitation by the limiter of the current amplitude or the phase), r' and x' are equivalent to the preset r and x.

On the other hand, at the time of the overcurrent, since the current amplitude is limited, the corrected virtual synchronous impedance Zs' (r' and x') required to suppress the output current is calculated. Therefore, in the present embodiment 4, the switch 8 of FIG. 3 becomes unnecessary.

Therefore, according to the present embodiment 4, in addition to the working and effect of the embodiments 1 to 3, a switching operation of the virtual synchronous impedance according to the presence or absence of the occurrence of the overcurrent can be eliminated.

[Embodiment 5]

Figure 10:
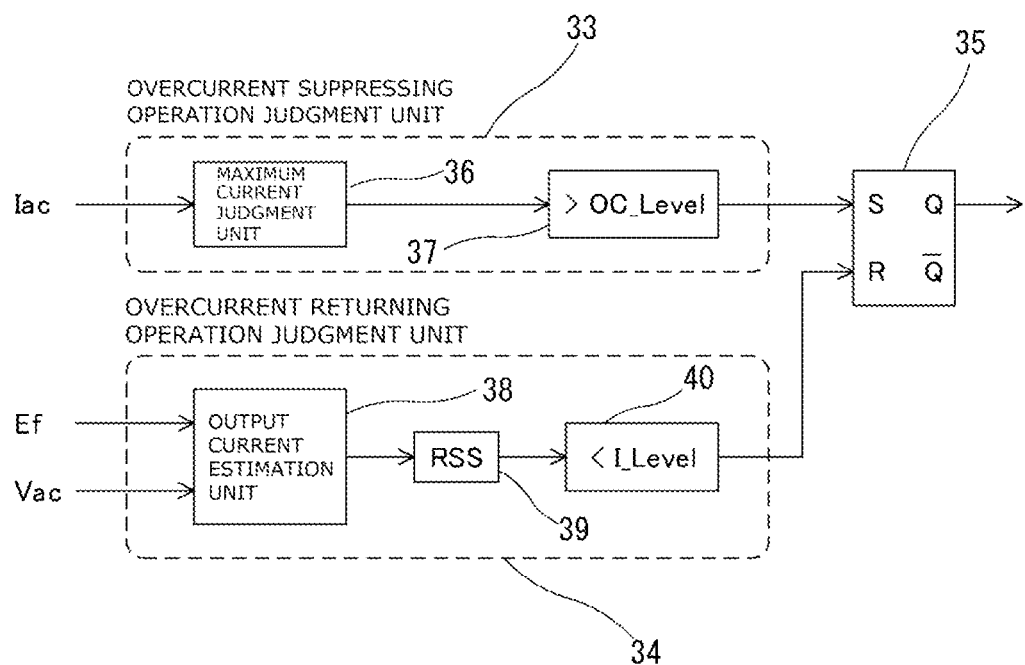
FIG. 10 is a schematic diagram showing an overcurrent judgment unit of the embodiment 5.

In an embodiment 5, an overcurrent judgment unit that judges whether the grid interconnection power conversion device is in the normal state or the overcurrent occurs will be described. FIG. 10 is a schematic diagram showing the overcurrent judgment unit of the present embodiment 5. As shown in FIG. 10, the overcurrent judgment unit has an overcurrent suppressing operation judgment unit 33, an overcurrent returning operation judgment unit 34 and a latch circuit 35.

The overcurrent suppressing operation judgment unit 33 has a maximum current judgment unit 36 and a comparator 37. The maximum current judgment unit 36 determines an output current maximum value of a full-wave rectification value from three phase instantaneous values of the output current detection value Iac. Here, it could also be possible to use an absolute value of a current vector by square root of sum of squares from two phase signals after DQ conversion. The comparator 37 performs an output current judgment by comparison between the output current maximum value and an overcurrent judgment level OC_Level, and outputs a signal of "1" level when the output current maximum value is greater.

The overcurrent returning operation judgment unit 34 has an output current estimation unit 38, an RSS (Root Sum Square) 39 and a comparator 40. The output current estimation unit 38 estimates, on the basis of the internal induced voltage Ef and the grid voltage detection value Vac, an output current estimation value flowing when returning the virtual synchronous impedance from the corrected virtual synchronous impedance Zs' to the virtual synchronous impedance Zs. The RSS 39 determines an absolute value of a vector of the estimated output current estimation value. The comparator 40 performs a first estimation current judgment by comparison between the absolute value of the vector of the output current estimation value and a current judgment level I_Level, and outputs a signal of "1" level when the absolute value of the vector of the output current estimation value is smaller.

The latch circuit 35 sets the overcurrent suppressing operation and holds an overcurrent suppressing operation state when an output of the overcurrent suppressing operation judgment unit 33 is the "1" level signal, and clears the overcurrent suppressing operation and holds an overcurrent returning state when an output of the overcurrent returning operation judgment unit 34 is the "1" level signal. That is, when the overcurrent is judged by or in the overcurrent suppressing operation judgment unit 33, the overcurrent suppressing operation state is held, while when the overcurrent returning operation is judged by or in the overcurrent returning operation judgment unit 34, the overcurrent returning state is held.

A switch judgment operation of the virtual synchronous impedance will be described below. When the maximum value of the full-wave rectification is calculated from the three phase instantaneous values of the output current detection value Iac and the maximum value exceeds the overcurrent judgment level OC_Level, the overcurrent is judged. When the overcurrent is judged, the virtual synchronous impedance Zs is switched to the corrected virtual synchronous impedance Zs' for suppressing the overcurrent. A judgment signal of the overcurrent suppressing operation is held in the latch circuit 35. Here, for the overcurrent suppressing operation judgment, square root of sum of squares can be used from DQ-axis components of the output current.

A returning condition judgment from the overcurrent suppressing operation uses the output current estimation value. From the expression (8), the output current output when returning the virtual synchronous impedance from the corrected virtual synchronous impedance Zs' to the virtual synchronous impedance Zs can be estimated. By calculating the absolute value of the output current vector (square root of sum of squares of the output current vectors) estimated by the expression (8) and comparing it with the current judgment level I_Level, a judgment is made as to whether or not the overcurrent occurs when returning the virtual synchronous impedance from the corrected virtual synchronous impedance Zs' to the virtual synchronous impedance Zs.

When the returning from an overcurrent state is judged, the switch 8 switches from the corrected virtual synchronous impedance Zs' to the virtual synchronous impedance Zs. A judgment signal of the overcurrent returning operation is held in the latch circuit 35.

As described above, according to the present embodiment 5, even if the overcurrent occurs in the DC/AC conversion device due to a short circuit accident etc. of the grid, it is possible to continue an operation with the current being limited to the current limit value which the DC/AC conversion device can output. Further, since a synchronizing power generated by action or working of the virtual synchronous impedance is still possessed, it is possible to synchronize the device with other voltage sources even during the current suppression.

In addition, by performing the overcurrent returning operation judgment from the estimated current, a situation where the overcurrent state occurs again when returning the virtual synchronous impedance from the corrected virtual synchronous impedance Zs' to the virtual synchronous impedance Zs then the overcurrent suppressing operation and the normal operation are repeated can be suppressed, thereby stably switching between the overcurrent suppressing operation and the normal operation.

[Embodiment 6]

Figure 11:
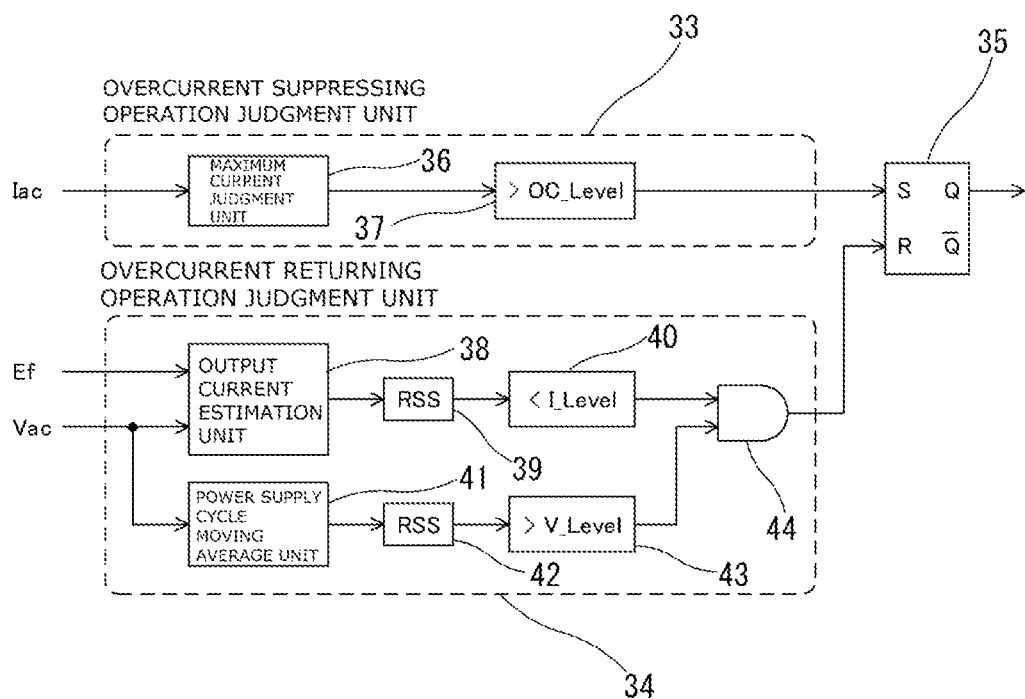
FIG. 11 is a schematic diagram showing an overcurrent judgment unit of the embodiment 6.

An embodiment 6 is the same as the embodiment 5 except for the overcurrent returning operation judgment unit 34 of the overcurrent judgment unit. FIG. 11 shows the overcurrent judgment unit of the present embodiment 6. In the present embodiment 6, as shown in FIG. 11, a moving average unit 41, an RSS 42, a comparator 43 and a logical product unit (or an AND unit) 44 are added to the overcurrent returning operation judgment unit 34 of the embodiment 5.

The moving average unit 41 performs a moving average process of the grid voltage detection value Vac between power supply cycles. The RSS 42 determines an absolute value of the moving average grid voltage detection value. The comparator 43 performs a voltage judgment by comparison between a voltage judgment level V_Level and an output (the absolute value of the moving average grid voltage detection value Vac) of the RSS 42, and outputs a signal of "1" level when the output of the RSS 42 is greater. The AND unit 44 outputs a signal of "1" level when outputs of the comparators 40 and 43 are both "1" level signals, and outputs a signal of "0" level in the other cases. That is, the overcurrent returning operation is judged by an AND condition of the first estimation current judgment and the voltage judgment.

The present embodiment 6 is the embodiment in which the judgment condition by the grid voltage is added to the overcurrent returning operation judgment unit 34 of the embodiment 5.

If a two-phase short circuit accident occurs on the grid 1 side, the grid voltage is brought into an imbalance state. Since the grid interconnection power conversion device operates as a voltage source with three-phase equilibrium, the output current oscillates and periodically exceeds the overcurrent level. In order to avoid the repetition of the overcurrent suppressing operation and the normal operation when the two-phase short circuit occurs, the voltage judgment by the grid voltage is provided.

If the DQ coordinate conversion is performed for a three-phase imbalance voltage (a voltage with three-phase imbalance), pulsation of the power supply cycle occurs in each of the D-axis and the Q-axis. Therefore, by performing the moving average process between power supply cycles, this pulsation is removed. As a method of the moving average process, there are a method in which sampling is performed in synchronization with the power supply cycle and a method in which sampling is performed asynchronously with the power supply cycle.

Although either method is possible, since an internal angular frequency and a grid frequency do not necessarily coincide with each other at an occurrence of grid disturbance etc. in the virtual synchronous generator control, the method in which the sampling is performed asynchronously, such as Patent Document 2, is desirable.

By the above method, by calculating the absolute value of the vector (square root of sum of squares of the vectors) of the grid voltage detection value Vac from which the pulsation component is removed and comparing it with the voltage judgment level V_Level, a judgment is made as to whether returning from a short circuit state occurs or not.

When the AND condition of the first estimation current judgment and the voltage judgment is satisfied, the virtual synchronous impedance is switched from the corrected virtual synchronous impedance Zs' to the virtual synchronous impedance Zs. A judgment signal of the overcurrent returning operation is held in the latch circuit 35.

As described above, the present embodiment 6 can obtain the same working and effect as those of the embodiment 5. Further, even in the case where the two-phase short circuit accident occurs, it is possible to continue the overcurrent suppressing operation without repeating the overcurrent suppressing operation and the normal operation during the short circuit, and a stable current can be output.

[Embodiment 7]

Figure 12:
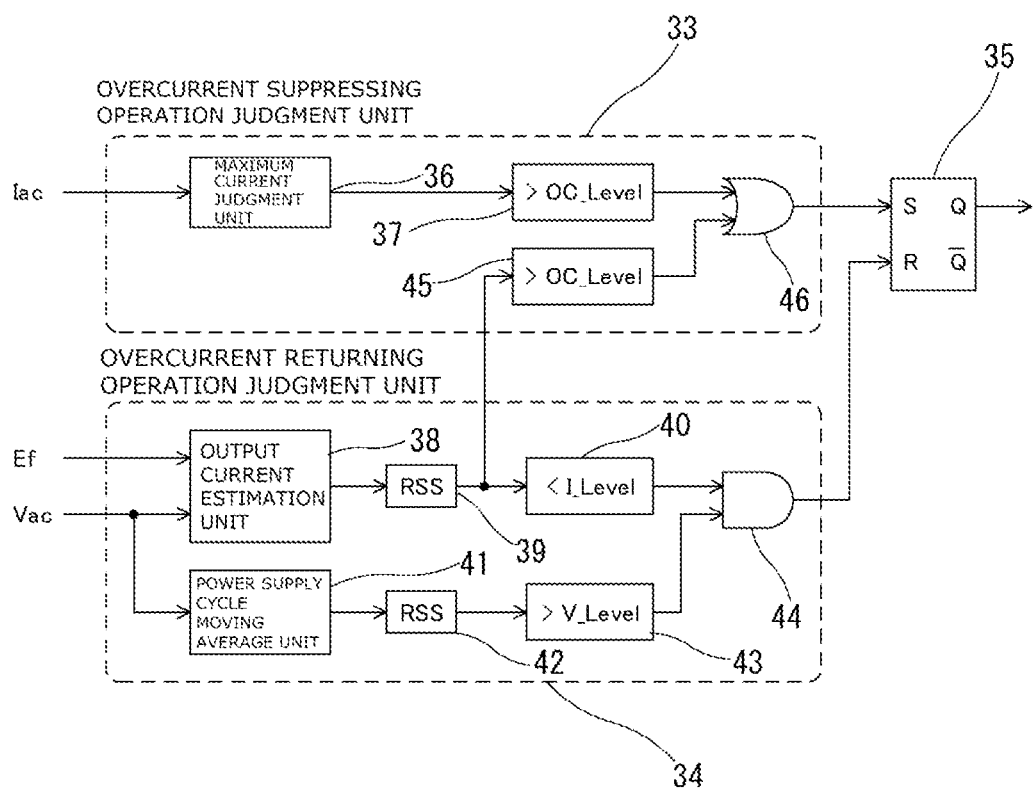
FIG. 12 is a schematic diagram showing an overcurrent judgment unit of the embodiment 7.

An embodiment 7 is the same as the embodiment 6 except for the overcurrent suppressing operation judgment unit 33 of the overcurrent judgment unit. FIG. 12 shows the overcurrent judgment unit of the present embodiment 7. In the present embodiment 7, as shown in FIG. 12, a comparator 45 and a logical sum unit (or an OR unit) 46 are added to the overcurrent suppressing operation judgment unit 33 of the embodiment 6.

The comparator 45 performs a second estimation current judgment by comparison between the absolute value (the output of the RSS 39) of the vector of the output current estimation value estimated by the output current estimation unit 38 in the overcurrent returning operation judgment unit 34 and the overcurrent judgment level OC_Level, and outputs a signal of "1" level when the output of the RSS 39 is greater. The OR unit 46 outputs a signal of "1" level when at least one of the outputs of the comparators 37 and 45 is "1" level signal, and outputs a signal of "0" level when both of the outputs of the comparators 37 and 45 are "0" level signal. That is, the overcurrent suppressing operation is judged by an OR condition of the output current judgment and the second estimation current judgment.

The present embodiment 7 is the embodiment in which the second estimation current judgment is added to the overcurrent suppressing operation judgment unit 33 of the embodiments 5 and 6. When the OR condition of the added second estimation current judgment and the output current judgment is satisfied, the overcurrent suppressing operation is judged.

Upon the occurrence of the short circuit accident of the grid, by the fact that drop of the grid voltage occurs, a voltage difference between an output voltage of the grid interconnection power conversion device and the grid voltage occurs, then the output current increases. By using the estimated current, the overcurrent state can be judged before an actual output current increases.

As described above, according to the present embodiment 7, the same working and effect as those of the embodiments 5 and 6 are obtained. Further, since it is possible to quickly shift to the overcurrent suppressing operation when the short circuit accident of the grid occurs, even in a case where an impedance up to a short circuit point of the grid is small and the output current abruptly or sharply increases, the overcurrent can be suppressed. Although FIG. 12 shows a drawing in which the present embodiment 7 is applied to the embodiment 6, the present embodiment 7 could be applied to the embodiment 5.

Only the above embodiments have been described in detail in the present invention. However, it is obvious to a person having ordinary skill in the art that variety of modifications and changes are possible within the scope of technical ideas of the present invention. As a matter of course, such modifications and changes belong to the scope of claim for patent.

The invention claimed is:

1. A grid interconnection power conversion device interconnecting a DC power supply through a DC/AC conversion device, an LC filter and a transformer and performing a control of a virtual synchronous generator, the grid interconnection power conversion device comprising:
an internal induced voltage calculation unit configured to calculate an internal induced voltage on the basis of an output current detection value, an effective value of an AC voltage detection value and a command value of an AC voltage effective value;
a VSG model configured to determine, on the basis of the internal induced voltage, the output current detection value and a power reference value, an angular frequency simulating a synchronous generator;
a Zs compensation unit configured to simulate drop of a voltage caused by an internal impedance of the synchronous generator on the basis of the internal induced voltage, a grid voltage detection value and the output current detection value and calculate a grid voltage command value;
an output voltage control unit configured to perform a voltage control so that the grid voltage detection value becomes the grid voltage command value and output a PWM control command value; and
a PWM control unit configured to output a gate command of the DC/AC conversion device on the basis of the PWM control command value and the angular frequency, wherein
the Zs compensation unit has
a Zs calculation unit configured to calculate an output current phase from the output current detection value, limit the output current phase so that the output current phase is within an effective range by a phase limiter and calculate a corrected virtual synchronous impedance on the basis of a limited output current phase, the internal induced voltage, the grid voltage detection value and a current limit value;
a $Vz_s$ calculation unit configured to calculate a voltage drop on the basis of a predetermined virtual synchronous impedance and the output current detection value in a normal state and calculate the voltage drop on the basis of the corrected virtual synchronous impedance and the output current detection value at a time of an occurrence of an overcurrent; and
a subtracter configured to output, as the grid voltage command value, a value obtained by subtracting the voltage drop from the internal induced voltage.

2. The grid interconnection power conversion device as claimed in claim 1, wherein
the phase limiter is configured to calculate a D'-axis that is a midpoint of an upper limit value and a lower limit value of the phase limiter, perform a coordinate conversion of the output current phase with the D'-axis being a reference, limit the output current phase with the D'-axis being the reference, and perform a coordinate conversion of a limited output current phase with an original D-axis being a reference.

3. The grid interconnection power conversion device as claimed in claim 2, wherein
the phase limiter is configured to set, as the D'-axis, a phase obtained by subtracting $5\pi/4$ from the upper limit value of the phase limiter or a phase obtained by subtracting $3\pi/4$ from the lower limit value of the phase limiter.

4. The grid interconnection power conversion device as claimed in claim 1, wherein
the corrected virtual synchronous impedance is expressed by the following expression (5),

[Expression 5]
$$\begin{bmatrix} r' \\ x' \end{bmatrix} = \frac{1}{I_{lim}} \begin{bmatrix} \cos\theta & \sin\theta \\ -\sin\theta & \cos\theta \end{bmatrix} \begin{bmatrix} E_d - V_d \\ E_q - V_q \end{bmatrix} \quad (5)$$

where θ is expressed by the following expression (7),

[Expression 7]
$$\tan^{-1}\left(\frac{-(E_d - V_d)}{E_q - V_q}\right) \le \theta \le \tan^{-1}\left(\frac{E_q - V_q}{E_d - V_d}\right) \quad (7)$$

where
r', x': the corrected virtual synchronous impedance
Ilim: the current limit value
θ: the output current phase
Ed: a d-axis component of the internal induced voltage
Eq: a q-axis component of the internal induced voltage
Vd: a d-axis component of the grid voltage detection value
Vq: a q-axis component of the grid voltage detection value.

5. The grid interconnection power conversion device as claimed in claim 1, wherein
the Zs calculation unit is configured to set the current limit value as a fixed value, and
the $Vz_s$ calculation unit is configured to, when the output current detection value is lower than the current limit value, as the normal state, calculate the voltage drop on the basis of the virtual synchronous impedance and the output current detection value, and when the output current detection value is the current limit value or greater, as the time of the occurrence of the overcurrent, calculate the voltage drop on the basis of the corrected virtual synchronous impedance and the output current detection value.

6. The grid interconnection power conversion device as claimed in claim 1, wherein
the Zs calculation unit is configured to calculate a magnitude of an output current vector from the output current detection value, and set, as the current limit value, a value limited to a current that can output the magnitude of the output current vector, and
the $Vz_s$ calculation unit is configured to compare the virtual synchronous impedance and the corrected virtual synchronous impedance, and when the virtual synchronous impedance is greater, as the normal state, calculate the voltage drop on the basis of the virtual synchronous impedance and the output current detection value, and when the corrected virtual synchronous impedance is greater, as the time of the occurrence of the overcurrent, calculate the voltage drop on the basis of the corrected virtual synchronous impedance and the output current detection value.

7. The grid interconnection power conversion device as claimed in claim 1, wherein
the Zs compensation unit has an overcurrent judgment unit configured to judge whether the normal state or the time of the occurrence of the overcurrent,
the overcurrent judgment unit has
an overcurrent suppressing operation judgment unit configured to judge an overcurrent suppressing operation on the basis of an output current judgment by comparison between a full-wave rectification maximum value of the output current detection value and an overcurrent judgment level;
an overcurrent returning operation judgment unit configured to estimate, on the basis of the internal induced voltage and the grid voltage detection value, an output current estimation value when returning from the corrected virtual synchronous impedance to the virtual synchronous impedance and judge an overcurrent returning operation on the basis of a first estimation current judgment by comparison between a square root of sum of squares of the output current estimation value and a current judgment level; and
a latch circuit configured to, when the overcurrent suppressing operation is judged by the overcurrent suppressing operation judgment unit, hold an overcurrent suppressing operation state, and when the overcurrent returning operation is judged by the overcurrent returning operation judgment unit, hold an overcurrent returning operation state.

8. The grid interconnection power conversion device as claimed in claim 7, wherein
the overcurrent returning operation judgment unit is configured to judge the overcurrent returning operation by an AND condition of a voltage judgment by comparison between a square root of sum of squares of a moving average value of the grid voltage detection value between power supply cycles and a voltage judgment level and the first estimation current judgment.

9. The grid interconnection power conversion device as claimed in claim 7, wherein
the overcurrent suppressing operation judgment unit is configured to judge the overcurrent suppressing operation by an OR condition of a second estimation current judgment by comparison between the square root of sum of squares of the output current estimation value and the overcurrent judgment level and the output current judgment.

10. A grid interconnection power conversion device interconnecting a DC power supply through a DC/AC conversion device, an LC filter and a transformer and performing a control of a virtual synchronous generator, the grid interconnection power conversion device comprising:
an internal induced voltage calculation unit configured to calculate an internal induced voltage on the basis of an output current detection value, an effective value of an AC voltage detection value and a command value of an AC voltage effective value;
a VSG model configured to determine, on the basis of the internal induced voltage, the output current detection value and a power reference value, an angular frequency simulating a synchronous generator;
a Zs compensation unit configured to simulate drop of a voltage caused by an internal impedance of the synchronous generator on the basis of the internal induced voltage, a grid voltage detection value and the output current detection value and calculate a grid voltage command value;
an output voltage control unit configured to perform a voltage control so that the grid voltage detection value becomes the grid voltage command value and output a PWM control command value; and
a PWM control unit configured to output a gate command of the DC/AC conversion device on the basis of the PWM control command value and the angular frequency, wherein
the Zs compensation unit has
a Zs calculation unit configured to calculate an output current phase from an output current estimation value, limit the output current phase so that the output current phase is within an effective range and calculate a corrected virtual synchronous impedance on the basis of a limited output current phase, the internal induced voltage, the grid voltage detection value and a current limit value;
a $Vz_s$ calculation unit configured to calculate a voltage drop on the basis of the corrected virtual synchronous impedance and the output current detection value in a normal state and also at a time of an occurrence of an overcurrent; and
a subtracter configured to output, as the grid voltage command value, a value obtained by subtracting the voltage drop from the internal induced voltage.

11. The grid interconnection power conversion device as claimed in claim 10, wherein
the output current estimation value is expressed by the following expression (8),

[Expression 8]

$$\begin{bmatrix} I_d \\ I_q \end{bmatrix} = \frac{1}{r^2 + x^2} \begin{bmatrix} r & x \\ -x & r \end{bmatrix} \begin{bmatrix} E_d - V_d \\ E_q - V_q \end{bmatrix} \quad (8)$$

where
Id, Iq: the output current estimation value
r, x: virtual synchronous impedance
Ed: a d-axis component of the internal induced voltage
Eq: a q-axis component of the internal induced voltage Vd: a d-axis component of the grid voltage detection value Vq: a q-axis component of the grid voltage detection value.

* * * * *